March 9, 1954
M. PETROFF
2,671,545
MAGNETIC FLUID CLUTCH
Filed July 20, 1949
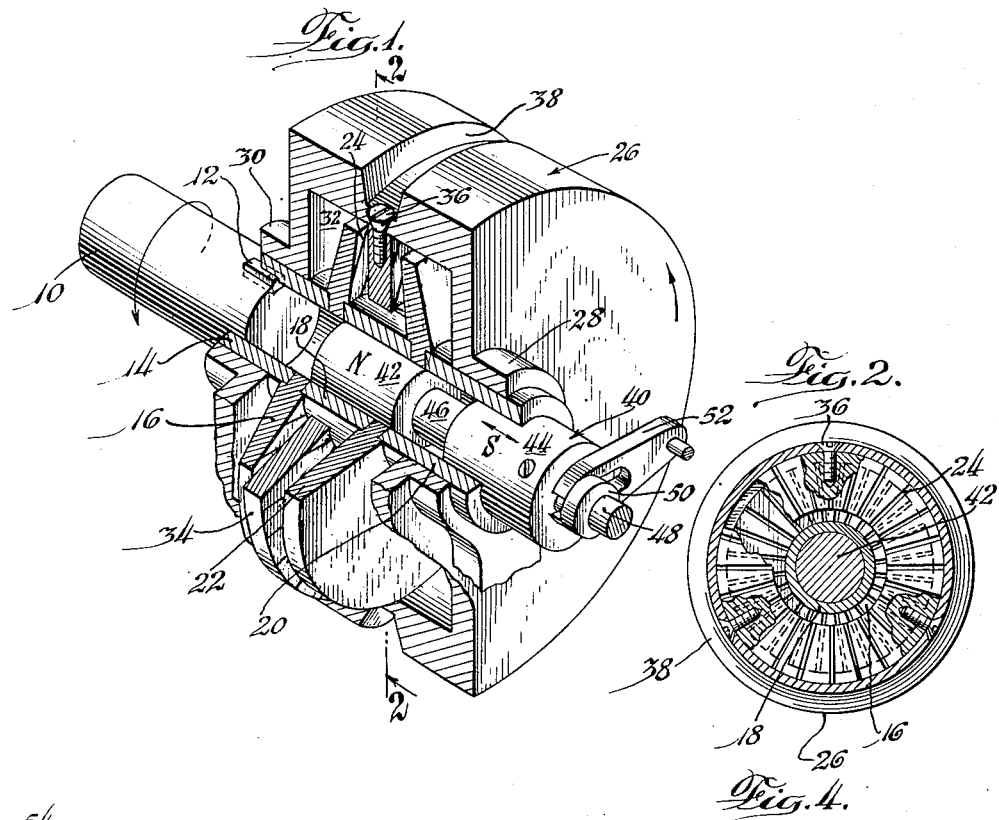
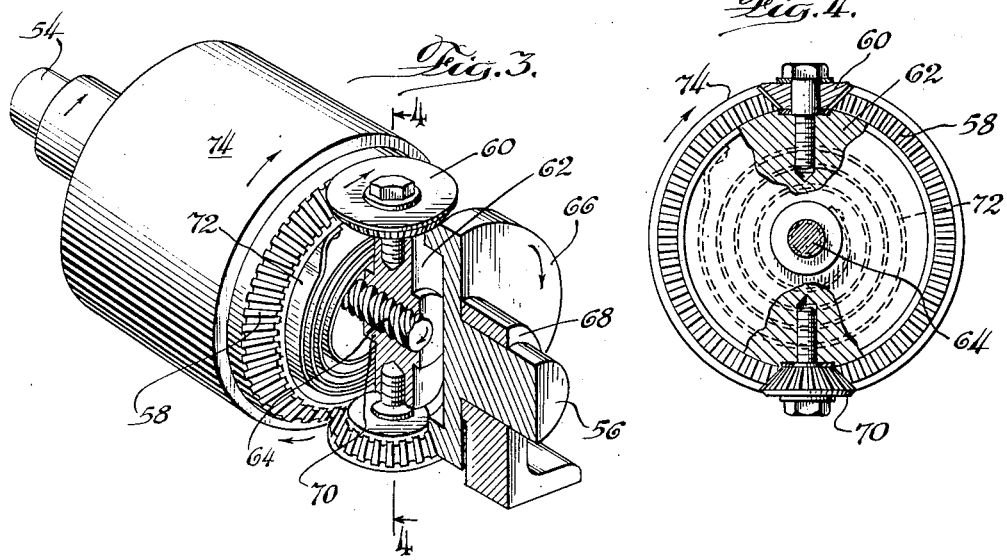
Inventor:
Merlin Petroff
By Hinkle, Horton, Ahlberg, Harrsmann & Kupper
Attorneys.

Patented Mar. 9, 1954

2,671,545

UNITED STATES PATENT OFFICE 2,671,545

MAGNETIC FLUID CLUTCH

Merlin Petroff, Round Lake, Ill., assignor to Stewart-Warner Corporation, Chicago, Ill., a corporation of Virginia Application July 20, 1949, Serial No. 105,758

9 Claims. (Cl. 192—21.5)

The present invention relates to a magnetic fluid clutch and to an embodiment of this clutch in a drive transmitting device. I am aware that magnetic clutches have been proposed in which an electromagnet is used to solidify an oil suspension of finely powdered iron so as to transmit torque from a driving member to a driven member by way of the congealed iron-oil mixture. It is, however, one of the objects of my invention to make use of such powdered iron-oil mixtures in a clutch which is operated without electrical connections and in which the efficiency of the clutch is improved over that ordinarily achieved so that the clutch may be operated with less power dissipation.

Another object is to provide an improved magnetic fluid clutch in which the magnetizing element is so efficiently utilized as to make the use of permanent magnetic materials practical even at comparatively high torque ranges.

Another object is to provide a novel and an improved permanent magnet actuated clutch using finely divided iron in oil as the torque transmitting link.

Still another object is to provide a novel device making use of such a clutch for the purpose of giving constant torque transmitting characteristics between drive and driven members.

Still another object is to provide an improved power coupling which gives a constant torque drive on the output side regardless of the speed of rotation of the driven device relative to the coupling driving element.

Other objects and advantages will become apparent from the following description of a preferred embodiment of my invention which is illustrated in the accompanying drawings.

In the drawings:

Fig. 1 is a diagrammatic perspective view of a magnetic fluid clutch embodying the present invention with portions of the walls thereof broken away to show the internal structure;

Fig. 2 is a transverse sectional view taken in the direction of the arrows substantially along the line 2—2 of Fig. 1;

Fig. 3 is a diagrammatic perspective view of a constant torque drive coupling embodying the clutch of Fig. 1; and Fig. 4 is a transverse sectional view which may be considered as taken in the direction of the arrows substantially along the line 4—4 of Fig. 3.

In Fig. 1 of the drawings I have shown a driving shaft 10 secured—as by a key 12, for instance—to a tube 14 at one end thereof. The tubular element 14 may be considered as one end of a compound clutch driving element made up of the short tube section 14 secured to a disk 16 which in turn is secured at its opposite face to a second tubular section 18 similar to that at 14 which in turn is spaced from a third tubular element 20 by a second disk 22. The three tubular elements 14, 18 and 20 all have the same internal and external diameters and are coaxial. The disks 16 and 22 have openings through the center thereof which are coaxial with the openings through the tubes 14, 18 and 20 and which are of the same diameter so that the compound structure made up of the three tubular sections plus the two disks forms a smooth tube internally after assembly of these parts. Assembly may be effected in any suitable manner, such as by brazing the elements together, for instance.

The tubular elements 14, 18 and 20 are formed of nonmagnetic material such as brass or stainless steel, for instance, while the disks 16 and 22 are formed of a material of reasonably high permeability to magnetic flux, such as soft iron. For a purpose to be described presently the disks 16 and 22 taper inwardly away from the axis so that at their peripheries their inner surfaces are spaced closer together than at the axis. Preferably also these disks are ribbed or fluted radially upon their adjacent faces as indicated at 24. The external diameters of the two disks are the same.

The major portion of the compound tube extending from one end 14 to the other end 20 is embraced within and rotatably fitted to a nonmagnetic case 26. This case is generally cylindrical in conformation and at one end is provided with a bearing extension 28 journaled to the tubular element 20 while at its other end a similar extension 30 is journaled to the tube 14. This case has a coaxial cylindrical cavity 32 within which the disks 16 and 22 are located. In other words, the length of the cavity 32 is somewhat greater than the spacing between the outside faces of the disks 16 and 22 while the diameter of the cavity 32 is somewhat greater than the diameter of these disks. The case 26, therefore, is free to rotate relative to the compound tubular element just described. In the interest of simplicity of illustration and understanding the case 26 has been shown as a single piece. To facilitate assembly, however, it of course should be formed of separate pieces threaded, bolted or otherwise secured together.

An annular ring 34 having an internal diameter substantially the same as the internal diameter of the cavity 32 is fitted therein and is retained in place and connected thereto by several screws 36 which extend through the case wall and into the ring 34. This last ring is axially spaced so as to lie mid way between the disks 16 and 22 and has an opening through the center large enough to clear the central tubular element 18. This disk 34 is made of soft iron or other magnetically permeable material.

From the above description it will be apparent that the case 36 and disk 34 rotate together and independently of the compound tubular element comprised of the tubes 14, 18 and 20 together with the disks 16 and 22. The output of the clutch is taken from the case 26; for instance, the external cylindrical surface may be grooved as at 38 to provide a pulley for a V-belt.

A dumbbell shaped permanent magnet 40 is formed to provide a pair of cylindrical pole pieces 42 and 44 separated by a necked-down portion 46 of small diameter. For convenience the pole 42 will be referred to as having a north polarity while the south pole will be assumed to be at 44. Both of the poles 42 and 44 have a diameter slightly less than the internal diameter of the compound tubular element previously described so that the magnet is free to slide within the tube. Each of the cylindrical poles has a length approximately equal to the distance between the disks 16 and 22 although this dimension is not critical. At its outward end the pole 44 is connected by an extension 48 and collar 50 to a nonmagnetic yoke 52 so that by moving the yoke inwardly or outwardly the magnet may be similarly moved within the cylindrical bore in which it reposes. The space within the cylindrical cavity 32 is substantially filled with a mixture of finely powdered iron and oil either through a plugged opening, not shown, or during assembly of the device.

The clutch operates in the following manner. If it is assumed that the shaft 10 is driven from some power source and that power is taken off from the pulley groove 38 and that the permanent magnet element is in the position shown such that the two ends of the north pole are substantially opposite the two central portions of the disks 16 and 22. These two disks will then be at substantially the same magnetic polarity and there is therefore little or no magnetic flux passing from one of the disks 16 to the other 22 and consequently the iron powder remains freely suspended within the oil. When the magnet is pushed inwardly, however, by manipulation of the yoke 52 so as to bring the north pole opposite the central opening in the disk 16 and the south pole opposite the similar opening in the disk 22, these two disks will have opposite polarity and magnetic flux will pass from one to the other by way of the centrally located disk 34. This causes congealing of the fluid mixture because of the tendency of the iron particles to stick and clump together, thereby producing a torque transmitting link between the disks 22 and 16 on the one hand and the disk 34 on the other hand.

Because of the rotation of the disks, particularly the disks 16 and 22 to begin with, this congealed fluid will have an outward component due to centrifugal action and this outward component will produce a greater effect upon the iron particles than upon the oil since the iron particles are of greater density. This action produces a greater concentration of the iron particles and therefore a greater congealing effect toward the outer periphery of the disks 16 and 22 than at a point closer to the center of rotation. This, together with the fact that the disks 16 and 22 are closer to each other at their peripheries than they are at the center, produces a concentration of the magnetic flux at or near the peripheries with the result that the magnetic flux path through the three disks is spaced well away from the axis of rotation at a point where the iron particles are also highly concentrated in the mixture and thus the clutch has greater torque transmitting ability because of the greater lever arm than would be true if the flux path through the disks was more or less evenly distributed. The centrifugal effect described is enhanced by the previously mentioned ribbing or fluting of the adjacent faces of the disks 16 and 22.

The clutch has its maximum torque transmitting characteristic when, as described, the north pole is opposite the disk 16 while the south pole is opposite the disk 22. By moving the magnet inwardly or outwardly from this position the dissimilarity of magnetic effect in the disks 16 and 22 is less pronounced so that the torque transmitting ability of the clutch is less.

It will be seen, therefore, that simply by moving the magnet through its range from one extreme to the other, the torque transmitting characteristics of the clutch can be smoothly varied from maximum to minimum.

An example of a constant torque device which makes use of this smoothly variable torque characteristic is illustrated in Figs. 3 and 4 where a drive shaft is indicated by the numeral 54 while a driven shaft is shown at 56. The drive shaft may be assumed to drive a clutch mechanism substantially identical to the device of Fig. 1 excepting that the case 26 of Fig. 1 instead of having a pulley groove 38 is provided at the end opposite the drive 54 with a beveled ring gear 58. This beveled gear is meshed with a pair of planetary gears 60 journaled to rotate upon a planet carrier which in the present instance comprises a disk 62 fitted at its center to a threaded shaft 64 which in turn may be assumed to be fixed to the dumbbell shaped magnet illustrated in Fig. 1.

A second beveled ring gear 66 parallel to the gear 58 is also meshed to the planets 60 and is mounted upon the power output shaft 56. This shaft and gear 66 are shown as being carried by a bearing 68. At its center the planet carrier 62 on the side facing the clutch is provided with a hub 70 which is connected to the inner end of a flat spiral spring 72, the outer end of which is secured to the ring gear 58.

This device operates in the following manner. If it is assumed that the magnet with the clutch of Fig. 3 is positioned, to begin with, with the north pole opposite one of the clutch driving disks and the south pole opposite the other driving disk so that the clutch has maximum torque transmitting characteristics, then rotation of the drive shaft 54 will cause rotation of the clutch case indicated at 74. This in turn drives the ring gear 58 and the planet carrier 62 through the spring 72. The planet carrier 62, therefore, tends to rotate with the clutch case 74 so as to cause the planet pinions 60 to drive the driven gear 66 without differential action taking place between the gears 58 and 66. Under these conditions the magnet which is splined to rotate with the tube 20 in which it slides rotates with the clutch case 74 so that the threaded shaft 64 rotates at the same speed as the case. Thus the entire unit rotates together.

If, now, the driven element 56 is called upon to transmit torque beyond the desired range, for instance if the drive take-off is used for reeling or similar operations where the speed of the driven device may be reduced, the higher torque reaction from the gear 66 will cause the planets 60 to lag relative to the driving gear 58. The planet carrier 62 therefore rotates upon the threaded shaft 64 since the magnet to which the threaded shaft is connected is keyed or splined to the clutch tube 20 as shown in Fig. 1. This relative rotation between the threaded shaft 64 and planet carrier 62 causes the threaded shaft to move inwardly relative to the clutch case 74, thereby moving the poles of the magnet away from their maximum position relative to the clutch plates 16 and 22 of Fig. 1 so as to reduce the torque transmitting ability of the clutch. Movement in this direction will take place until the torque transmitting ability of the clutch has adjusted itself to the speed relation required between the drive element 54 and driven element 56. It will be seen, therefore, that if a coupling of this character is used in the torque path in a reeling operation, the reel will always keep the reeled material under a substantially constant degree of tension, and the reel will operate at whatever rotational speed is necessary to insure taking up the reeled material under constant tension. Further, this operation will be conducted with an efficient use of power and without excessive heating which is frequently troublesome when ordinary slip clutches are used in such operations.

Although I have described a diagrammatic embodiment of the clutch forming the subject matter of this invention and a constant torque drive mechanism incorporating a clutch of this type, other embodiments of the invention will suggest themselves to those skilled in the art. The scope of the invention, therefore, is to be measured by the scope of the following claims.

I claim:

1. A magnetic fluid clutch comprising a pair of disc shaped rotatable clutch driving elements arranged in spaced apart relationship, a tubular element extending between said disc shaped elements in coaxial relationship thereto and connected to said disc shaped elements, a case enclosing said disc shaped elements and mounted to be rotatable relative thereto, a driven disc shaped element secured to said case and disposed between said driving elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said clutch driving elements, and means for shifting the position of the permanent magnet relative to said driving elements.

2. A magnetic fluid clutch comprising a pair of disc shaped rotatable clutch driving elements arranged in spaced apart relationship, said driving elements being closer together at their peripheries than adjacent their axis, a tubular element extending between said disc shaped elements in coaxial relationship thereto and connected to said disc shaped elements, a case enclosing said disc shaped elements and mounted to be rotatable relative thereto, a driven disc shaped element secured to said case and disposed between said driving elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said clutch driving elements, and means for shifting the position of the permanent magnet relative to said driving elements.

3. A magnetic fluid clutch comprising a pair of disc shaped rotatable clutch driving elements arranged in spaced apart relationship, said elements being ribbed in a generally radial direction upon their adjacent faces, a tubular element extending between said disc shaped elements in coaxial relationship thereto and connected to said disc shaped elements, a case enclosing said disc shaped elements and mounted to be rotatable relative thereto, a driven disc shaped element secured to said case and disposed between said driving element, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said clutch driving elements, and means for shifting the position of the permanent magnet relative to said driving elements.

4. A magnetic fluid clutch comprising a pair of disc shaped rotatable clutch elements arranged in spaced apart relationship, said elements being closer together at their peripheries than adjacent their axis, a tubular element extending between said disc shaped elements in coaxial relationship thereto and connected to said disc shaped elements, a case enclosing said disc shaped elements and mounted to be rotatable relative thereto, a third disc shaped element secured to said case and disposed between said pair of elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said pair of clutch elements, and means for shifting the position of the permanent magnet relative to said pair of elements.

5. A magnetic fluid clutch comprising a pair of disc shaped rotatable clutch elements arranged in spaced apart relationship, a tubular element extending between said disc shaped elements in coaxial relationship thereto and connected to said disc shaped elements, a case enclosing said disc shaped elements and mounted to be rotatable relative thereto, a third disc shaped element secured to said case and disposed between said pair of elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said pair of clutch elements, and means for shifting the position of the permanent magnet relative to said pair of elements.

6. A magnetic fluid clutch comprising a pair of disc shaped rotatable clutch elements arranged in spaced apart relationship, said elements being closer together at their peripheries than adjacent their axis and being ribbed in a generally radial direction upon their adjacent faces, a tubular element extending between said disc shaped elements in coaxial relationship thereto and connected to said disc shaped elements, a case enclosing said disc shaped elements and mounted to be rotatable relative thereto, a third disc shaped element secured to said case and disposed between said pair of elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said pair of clutch elements, and means for shifting the position of the permanent magnet relative to said pair of elements.

7. A magnetic fluid clutch comprising a pair of disc shaped rotatable clutch elements arranged in spaced apart relationship, said elements being closer together at their peripheries than adjacent their axis, a tubular element extending between said disc shaped elements in coaxial relationship thereto and connected to said disc shaped elements, a case enclosing said disc shaped elements and mounted to be rotatable relative thereto, a third disc shaped element secured to said case and disposed between said pair of elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said pair of clutch elements, and means for shifting the position of the permanent magnet relative to said pair of elements.

8. A constant torque transmitting device comprising a pair of disc shaped rotatable clutch elements arranged in spaced apart relationship, said elements being closer together at their peripheries than adjacent their axis and being ribbed in a generally radial direction upon their adjacent faces, a tubular element extending between said disc shaped elements in coaxial relationship thereto and connected to said disc shaped elements, a case enclosing said disc shaped elements and mounted to be rotatable relative thereto, a third disc shaped element secured to said case and disposed between said pair of elements, all of said disc shaped elements being formed of a magnetic material, a quantity of a mixture of powdered iron and oil or the like substantially filling said case, a permanent magnet slidable in said tubular element, said magnet having north and south poles spaced apart by substantially the distance between said pair of clutch elements, a torque responsive element connected to be driven from said case, and means operated by said torque responsive element for shifting the position of said magnet relative to said pair of clutch elements according to the torque imposed upon said torque responsive element.

9. A magnetic fluid clutch comprising a pair of coaxial disc shaped rotatable driving and driven clutch elements formed of magnetic material arranged in axially spaced apart relationship, said elements being closer together at their peripheries than adjacent their axis so as to form a radially tapered magnetic flux gap between said elements which is shorter at their peripheries than adjacent their axis to concentrate magnetic flux between said elements at their peripheries, a case enclosing said disc shaped elements, a quantity of a mixture of powdered iron and oil or the like substantially filling said case, and means forming a magnetic circuit including a magnetizing element and said discs for establishing a magnetic field across the gap separating said discs.

MERLIN PETROFF.

References Cited in the file of this patent

UNITED STATES PATENTS

| Number | Name | Date |
|---|---|---|
| 811,654 | Murphy | Feb. 6, 1906 |
| 1,862,267 | Honig | June 7, 1932 |
| 1,950,810 | Nichols | Mar. 13, 1934 |
| 2,437,871 | Wood | Mar. 16, 1948 |
| 2,479,989 | Winther | Aug. 23, 1949 |
| 2,557,140 | Razdowitz | June 19, 1951 |

FOREIGN PATENTS

| Number | Country | Date |
|---|---|---|
| 984,127 | France | July 2, 1951 |
| 485,591 | Belgium | Nov. 13, 1948 |

OTHER REFERENCES

Technical Report 1213, National Bureau of Standards, Washington, D. C. Copy received in Div. 68, U. S. Patent Office, on March 30, 1948.